United States Patent [19]
Hibbard et al.

[11] Patent Number: 5,514,282
[45] Date of Patent: May 7, 1996

[54] FOOD PROCESSING WASTEWATER TREATMENT AND RECOVERY PROCESS

[76] Inventors: David C. Hibbard, 3998 Wood Ridge Trace; Bala Raghunath, 1430 22nd Ave., So., Apt. #3, both of Wisconsin Rapids, Wis. 54494; Craig S. Guyse, 5140-½ Stoney Brook Rd., Rudolph, Wis. 54475

[21] Appl. No.: 222,600

[22] Filed: Apr. 1, 1994

[51] Int. Cl.⁶ ................................................. B01D 61/00
[52] U.S. Cl. .................... 210/652; 210/650; 210/651; 210/704; 210/705; 210/723; 210/195.2; 210/257.2; 210/202
[58] Field of Search ..................... 210/704, 705, 210/723, 724, 650, 651, 652, 257.2, 195.2, 202

[56] References Cited

U.S. PATENT DOCUMENTS

| | | | |
|---|---|---|---|
| 3,917,526 | 11/1975 | Jennings | 210/651 |
| 4,482,459 | 11/1984 | Shiver | 210/652 |
| 4,738,750 | 4/1988 | Ackel | 210/705 |
| 4,790,943 | 12/1988 | Dunn et al. | 210/705 |
| 5,064,531 | 11/1991 | Wang et al. | 210/96.1 |
| 5,173,190 | 12/1992 | Picek | 210/651 |
| 5,204,007 | 4/1993 | Mosley et al. | 210/705 |
| 5,207,921 | 5/1993 | Vincent | 210/704 |
| 5,262,047 | 11/1993 | Benskin et al. | 210/181 |

OTHER PUBLICATIONS

"The Removal of Heavy Metals from Sewage Influent Waters by Foam Flotation", Chavalitnitikul and Brunker, Mid–Atlantic Ind. Waste Conference, 1981.

APV The Zeda Process, APV Pasilac Anhydro AS, dated Dec. 13, 1989.

Application of Adsorptive Bubble Separation Techniques to Wastewater Treatment by D. Jenkins, J. Scherfig and D. W. Eckhoff, Chapter 14 of "Adsorptive Bubble Separation Techniques" Edited by Robert Lemlich, Department of Chemical and Nuclear Engineering, University of Cincinnati, Cincinnati, Ohio, 1972.

*Primary Examiner*—Ana Fortuna
*Attorney, Agent, or Firm*—Andrus, Sceales, Starke & Sawall

[57] ABSTRACT

A system and related method for the treatment of dairy and other food processing plant wastewaters provides recoverable by-products from two separate stages and a final water effluent clean enough for direct discharge or process reuse. The system provides an effective alternate to conventional wastewater treatment and includes, as its operating steps which provide useful by-products, dissolved air flotation and membrane separation. The recoverable by-products from these two unit operations are high in amino acids and provide sufficient nutritional value to permit their use as animal feed or fertilizer products.

17 Claims, 1 Drawing Sheet

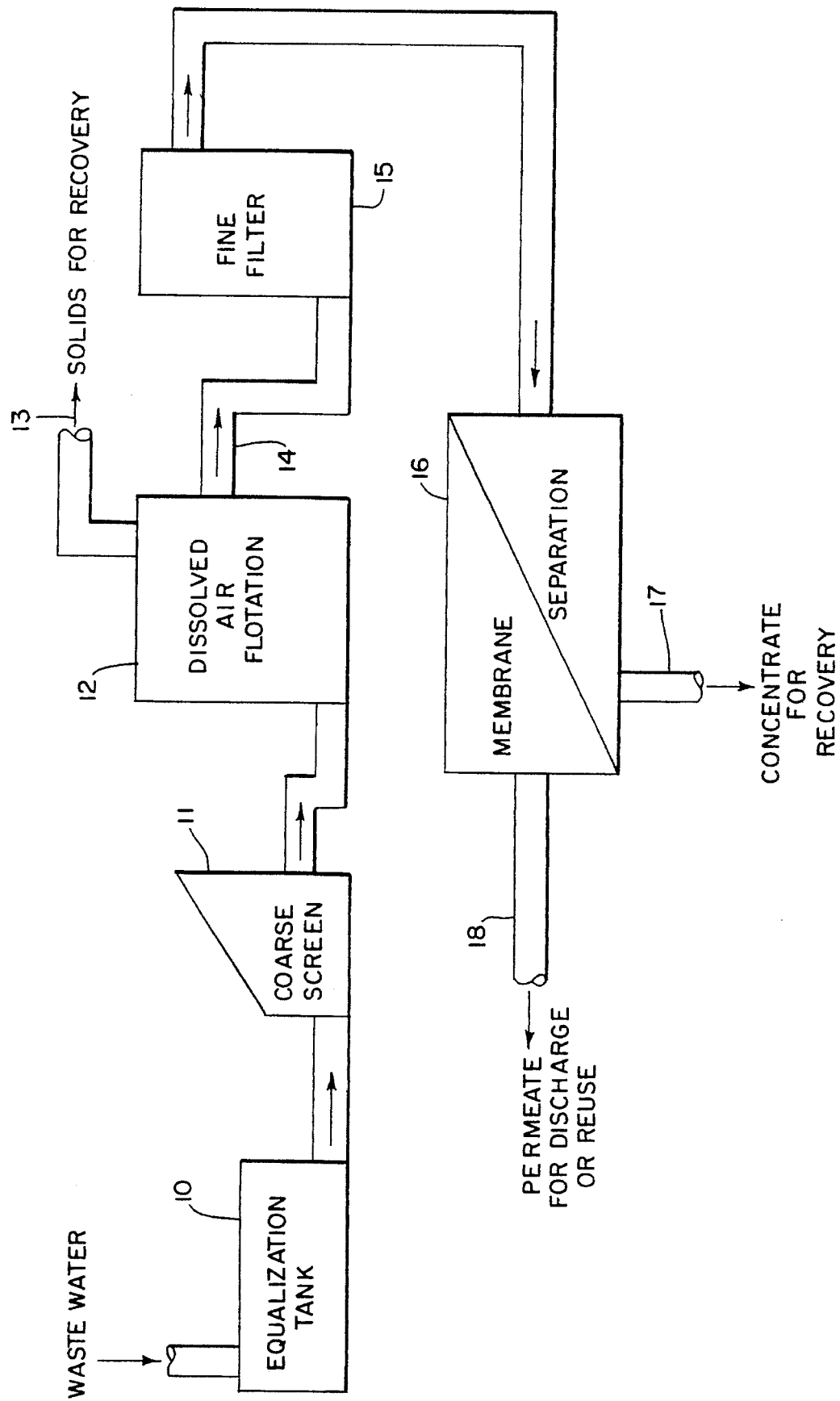

FOOD PROCESSING WASTEWATER TREATMENT AND RECOVERY PROCESS

BACKGROUND OF THE INVENTION

The present invention pertains to the treatment of food processing wastewaters to provide a potentially important feed value or fertilizer by-product and a directly dischargeable or recyclable effluent. In particular, the process and related method are especially adapted to the treatment of dairy plant process wastewater streams to provide a valuable animal feed supplement or a fertilizer and a dischargeable effluent or a reusable water source which is clean and environmentally safe.

Food processing operations, such as dairy plants, suffer significant product losses from spills, rinsing, and clean-in-place procedures in which the water borne product, constituting a random liquid mixture, is sewered or wasted. This wastewater may be treated on site in a captive wastewater treatment system or, more typically, discharged into a municipal sewerage system for treatment in a central municipal wastewater treatment facility. The first means of treatment on site requires a substantial capital expenditure and the alternate municipal treatment often subjects the plant operator to substantial surcharges because of the typically high suspended solids, biochemical oxygen demand (BOD), and phosphorous or other mineral loadings of the discharged effluent.

In the dairy industry, and in cheese plants in particular, whey produced as a by-product of the cheese making process was previously discharged as a wastewater. Today, this cheese making by-product is processed to recover protein, lactose and minerals. However, the effluent from spills, rinses and cleaning procedures is still handled as a wastewater.

U.S. Pat. No. 5,173,190 describes the reconditioning and reuse of poultry processing rinse water, including the basic steps of screening, flotation, and membrane separation. The system is directed to reconditioning the rinse water for recirculation and reuse, but does not provide for any use of the suspended solids removed in the flotation step or the concentrate removed by membrane filtration.

U.S. Pat. No. 3,917,526 describes a multi-stage separation system which includes, as two of the steps, foam flotation and membrane separation. One specific application of the process is identified as the separation of cheese whey to recover protein and lactose. In particular, the concentrate pressure at the membrane separation stage is utilized to operate a jet pumping adductor to assist in withdrawing the foam and entrained solids from the foam flotation apparatus.

However, whey recovery processes in the dairy industry are well established. Whey is a known and relatively stable product of a cheese making process and is capable of being processed for protein, lactose and mineral recovery in a well known and straightforward manner. Dairy and other food processing plant wastewaters, on the other hand, contain a wide variety of other contaminants and foreign matter resulting from rinsing and cleaning processes, such as grit, debris, detergents and the like. These wastewaters also typically have high phosphorous loadings. As a result, these dairy and food processing plant wastewaters have a widely varying and often unpredictable makeup resulting in the simple expedient of discharge to the sewer for conventional wastewater treatment and no recoverable by-product.

Nevertheless, a typical dairy plant may lose approximately 2.5% of its fluid milk intake to waste related to spillage, rinsing and cleaning. Therefore, it would be most desirable to be able to capture the suspended and dissolved solids lost in these wastewaters to simultaneously recover a potentially valuable feed value by-product and provide an effluent clean enough for direct discharge or reuse.

SUMMARY OF THE INVENTION

The method of the present invention is directed to the recovery of a potentially valuable feed value or fertilizer by-product with the concomitant production of environmentally safe discharge or reuse quality water from food plant process wastewater streams and includes the steps of: subjecting the water stream to dissolved air flotation to remove a major proportion of the suspended solids; subjecting the water stream to membrane separation to produce a high quality permeate water stream that is practically free of all the original feedwater constituents and a concentrate containing substantially all dissolved solids; retaining both the solids removed in the flotation step and the dissolved solids removed in the membrane separation step; and, discharging or recycling the permeate from the membrane separation step. In addition to direct discharge of the permeate, as to a surface water body or sewer, the permeate could also be of sufficiently high quality to be recycled and used, for example, for clean in place processes at the plant or for other process uses. Thus, as used herein, the discharge of the permeate from membrane separation is intended to cover recycling of the permeate as well.

The method may also include a screening step to remove coarse organic and inorganic solid materials, preferably solid materials of a size greater than about 500 microns. The dissolved air flotation step preferably includes the use of a coagulant and a flocculent, and removes essentially all suspended matter greater than 20–30 microns. The method may further include a filtering step to remove any remaining suspended solids not captured in the dissolved air flotation step, preferably any remaining suspended solids of a size greater than about 5–10 microns. In the presently preferred embodiment, the membrane separation step utilizes a reverse osmosis membrane.

In one embodiment, the method includes the preliminary step of providing temporary storage for the wastewater stream to equalize the waste material content. Where the wastewater stream is obtained from a dairy process plant, the preliminary step preferably includes maintaining the pH of the wastewater entering the system in the range of about 6.5 to 8.0. This pH range is important for the reliable and sustained operation of the dissolved air flotation unit.

The system of the present invention for recovering a potentially important feed value or fertilizer by-product including proteins, carbohydrates and minerals from food plant process wastewater streams with the concomitant production of environmentally safe discharge quality water includes a dissolved air flotation device for removing a major proportion of the suspended solids to produce a recoverable portion of the by-product and a selective membrane separator for recovering the other portion of a potentially important feed value or fertilizer by-product and producing a high quality discharge water stream. The system preferably also includes a screen upstream of the dissolved air flotation device for removing coarse organic and inorganic solid materials and a filter upstream of the membrane for removing substantially all of the remaining suspended solids. The screen is preferably capable of retaining solid particles of a size greater than about 500 microns. The filter preferably has a porosity in the range of about 5 to 10 microns, and the membrane separator has a size cutoff of less than about 0.001 micron, although membrane separators with substantially larger cutoff of up to about 2 microns may be suitable for wastewaters with proportionally larger sizes of dissolved solids.

The method of the present invention has most preferably been applied to the recovery of potentially important feed value or fertilizer by-product with the concomitant production of environmentally safe discharge quality water from the cleaning and processing wash and rinse wastewater streams of a dairy plant, and includes the steps of: screening the stream to remove coarse organic and inorganic materials; subjecting the water stream to dissolved air flotation treatment to remove a major portion of the suspended solids; retaining the solids removed in the flotation treatment step; filtering the water stream to remove substantially all of the remaining suspended solids; subjecting the water stream to membrane separation; and retaining the concentrate from the membrane separation step; and discharging (or recycling) the high quality permeate stream.

BRIEF DESCRIPTION OF THE FIGURE

The single drawing FIGURE shows a schematic representation of the method and system of the present invention.

DETAILED DESCRIPTION OF THE PREFERRED EMBODIMENTS

A typical dairy plant may lose as much as 2.5% of the milk it processes from spills, rinses, and clean-in-place procedures. The total wastewater flow from these losses may be as high as 300 gpm or more. In addition to the milk or milk equivalent content of the wastewater stream, a wide range of contaminants will be found, including sand, dirt, and other debris picked up from the floors and drains, and chemicals from the soaps and detergents used in cleaning, including phosphorous. The wastewater stream may contain suspended solids in concentrations of 3,000 mg/l and biochemical oxygen demand (BOD) levels of 2,500 mg/l or greater. In addition, the loadings of phosphorous and other minerals are typically high, due to the relatively high phosphorous content of the milk itself as well as to phosphorous additions from detergents used in cleaning. These wastewater streams are typically either treated on site or directed to municipal treatment facilities for conventional sewage treatment.

Referring to the drawing, in accordance with the process of the present invention potentially important feed value or fertilizer grade by-products may be recovered from the wastewater stream with the simultaneous production of high quality environmentally safe discharge stream. The wastewater stream is initially collected in a holding or equalization tank 10 where the pH may be adjusted, if necessary, and a metered flow is directed into the treatment system. From the equalization tank 10 the wastewater flow is passed through a coarse screen 11 to remove large solid materials in excess of about 500 microns (0.02 inch) in size. The screen 11 may, for example, comprise a conventional wedge wire screen. The solids removed by the screen may be both organic or inorganic in nature. However, in some instances, the make-up of the wastewater stream may allow elimination of the coarse screen. After coarse screening or directly from the equalization tank 10, the wastewater is directed to a dissolved air flotation (DAF) unit 12 where most of the suspended solids, including nearly all of the fats, oils and grease and a portion of precipitated/agglomerated proteins are removed. A portion of BOD reduction occurs at this point depending on the type and relative constitution of the suspended solids. In addition, dissolved air flotation has been found effective to remove the greater proportion of phosphates from the wastewater stream.

As is known in the art, performance of the dissolved air flotation unit 12 is enhanced by the use of appropriate coagulants and flocculents. In particular, a coagulant such as ferric sulfate at a concentration of about 150–300 ppm and a flocculent such as a feed grade non-ionic polymer at a concentration of about 5–10 ppm have been found particularly effective. It has also been found that variations in the selected operating concentration of the flocculent up to 30% do not measurably affect DAF performance. However, it has been found important to maintain the concentration of the coagulant within 10% of the selected operating level in order to maintain most effective DAF performance.

It has also been found that the pH of the wastewater stream from the equalization tank 10 is preferably maintained within a fairly small range in order to maintain consistent performance of the dissolved air flotation unit. Surges in the wastewater flow into the equalization tank, leading to high or low pH will, if passed directly to the DAF unit 12, have a significant adverse effect on the performance of the coagulant. For example, periodic cleaning may result in a short term pH surge in the equalization tank which, if not adjusted, will adversely affect the DAF process. Thus, it is important to monitor pH in the equalization tank to maintain a pH in the wastewater feed to the DAF unit in the range of about 6.5 to 8.0. This requires the selection of the equalization tank size to be based on the surge volume that has the maximum impact on pH.

The agglomerated solids 13 which are skimmed from the DAF unit 12 may represent about 2% of the total wastewater stream, but have a high concentration of fats, oils and greases, typically in excess of 90% of the total contained in the wastewater stream. A portion of BOD reduction occurs at this point depending on the relative makeup of the suspended solids matter with BOD constituting substances. The DAF unit has unexpectedly been found to also effect a high removal of phosphorous from the wastewater feed stream. Total phosphorous removals in excess of 70% have been typically attained in the DAF unit, suggesting the efficacy of DAF for the removal of certain dissolved solids as well as the typically high suspended solids removal. High phosphorous removal in the DAF unit significantly enhances the downstream performance of the reverse osmosis membrane to be described.

The effluent 14 from the DAF unit may be subjected to fine filtration before being directed to the membrane separation unit 16 for final treatment. The fine filter 15 is intended primarily as a protective device for the membrane separation unit 16 and, in certain applications and depending on the type of membrane used, may be eliminated. The fine filter 15 may comprise any of a wide variety of filtration units capable of removing particles in the size range of approximately 5 to 10 microns. The fine filter unit may comprise a fabric bag filter of polyester, nylon, or other suitable synthetic material. The primary purpose of the fine filter 15 is to protect the downstream membrane 16 from upsets in the DAF unit. During typical steady state operation, the fine filter will not add significantly to the removal of suspended solids. However, suspended solids which escape removal in the DAF unit 12 because of a temporary imbalance or upset condition will be effectively captured by the fine filter and preclude excessive loadings on the membrane separation unit.

The membrane separation unit 16 receives the effluent 14 from the DAF unit after passage through the fine filter 15. As indicated, the wastewater stream 14 is typically unaffected by the fine filter if the DAF unit is operating properly. However, there may be some removal of suspended solids by the fine filter 15.

The membrane used in the unit 16 for dairy plant wastewater processing preferably operates as a true reverse osmosis unit and thus is capable of removing all dissolved solids larger than 0.001 micron. This high removal efficiency is necessary both to maximize the retainment of virtually all the non-aqueous feed constituents in the concentrate 17 which also comprises a potentially valuable by-product and also to assure that the permeate 18 is of a quality sufficient to allow direct surface discharge. For example, a polyamide membrane having an average salt (sodium chloride) rejection of 98.5% under standard conditions of temperature (77° F.), pressure (400 psi) and salt concentration (1,000 mg/l), which also approximately represents a size cut-off of less than about 0.001 micron, has been found to be adequate. However, membranes capable of removing solids less than 2 microns may be adequate for other waste streams.

Because a high percentage of fats, oils and greases (FOG) are removed in the DAF unit 12, there is little FOG product in the concentrate 17 resulting from membrane separation. However, the small percentage of fats that may have escaped removal by the DAF will be removed in the downstream membrane separation step and will form a part of the concentrate. The large proportion of the concentrate 17 in a dairy plant application comprises primarily proteins and lactose, contributing the greater part of the remaining BOD in the effluent 14, as well as phosphates and other minerals, comprising the remaining dissolved solids. A lesser percentage of suspended solids which may remain in the effluent 14 is virtually completely removed in the concentrate 17.

The following TABLE 1 shows the performance of a system treating animal feed processing plant wastewater in terms of removal in the respective dissolved air flotation (DAF) and reverse osmosis (RO) steps of (1) total biochemical oxygen demand (BOD), (2) total fats, oils and grease (FOG), (3) total suspended solids (TSS), and (4) total phosphorous (in the form of phosphates).

TABLE 1

| WASTEWATER STREAM | % REMOVAL OF: | | | |
| --- | --- | --- | --- | --- |
| | BOD | FOG | TSS | PHOSPHATES |
| CLARIFIED STREAM (14) FROM DAF (12) | 63 | 94 | 78 | 78 |
| PERMEATE (18) FROM RO (16) | 98 | 100 | 100 | 99.8 |

Both the solids 13 removed in the dissolved air flotation unit 12 and the concentrate 17 from reverse osmosis separation 16, though significantly different in terms of concentrations of their constituent components, have been found to be high in amino acid content, up to about 40%. Amino acids are known to be important from the standpoint of nutritional value, allowing both the solids 13 from DAF and the concentrate 17 from RO to be potentially valuable as a feed product or as a fertilizer. In both cases, the by-products may be subjected to further concentration processes to remove excess water and possibly undesirable solid materials. Equally importantly, the permeate 18 after membrane separation is free of fats and suspended solids and, as shown in TABLE 1, virtually free of BOD and phosphorous. The levels of BOD and phosphates are low enough to permit direct discharge without further treatment under typical known discharge regulations.

A more detailed summary of system performance is shown in TABLE 2, which covers the operation of the system in two different plants over, respectively, two and four day test periods. Plant 1 was an animal feed plant in which the process wastewater was high in concentrated milk solids. Plant 2 was a dairy plant in which the process wastewater contained essentially milk along with the usual contaminants associated with wash, rinse, and clean-in-place procedures.

TABLE 2

| | | Plant 1 | | Plant 2 | | | |
| --- | --- | --- | --- | --- | --- | --- | --- |
| | | Day 1 | Day 2 | Day 1 | Day 2 | Day 3 | Day 4 |
| CONCENTRATION IN WASTEWATER (mg/l) | TSS | 3280 | 1290 | 123 | 120 | 650 | 40 |
| | P | 112 | 71.3 | 47.2 | 28 | 23 | 15 |
| | BOD | — | 670 | 387 | 470 | 220 | 620 |
| DAF REMOVAL (%) | TSS | 97.3 | 90.1 | 61.8 | 63.3 | 97.5 | 32.5 |
| | P | 73.9 | 77.4 | 73.1 | 87.5 | 42.6 | 88.7 |
| RO REMOVAL (%) | TSS | 100 | 100 | 100 | 100 | 100 | 100 |
| | P | 99.8 | 99.9 | 99.8 | 99.9 | 99.8 | 98.3 |
| | BOD | — | 98.5 | 97.4 | 97.9 | 99 | — |
| CONCENTRATION IN RO PERMEATE (mg/l) | TSS | 0 | 0 | 0 | 0 | 0 | 0 |
| | P | .28 | <.1 | .1 | <.04 | <.04 | .26 |
| | BOD | <7 | <10 | 10 | 10 | <10 | — |

The concentration of the contaminants in the effluent or permeate 18 from reverse osmosis (RO) separation provides a good indication of the quality of the water discharged from the system. Typical regulatory limits on the three indicated contaminants, total suspended solids (TSS), phosphorous (P), and biochemical oxygen demand (BOD), which must be met before the water may be discharged directly into a waterway are as follows. In milligrams per liter (mg/l) for each of the contaminants, typical limits are 10 TSS, 1 P, and 10 BOD. As may be seen in Table 2, the system consistently removed all suspended solids (TSS), all but trace amounts of phosphorous (P), and reduced the biochemical oxygen demand (BOD) to or below the 10 mg/l level. A simple oxidation may be performed as a final polishing step, if required.

The unique combination of dissolved air flotation and membrane separation operate to provide the two-fold benefits of a directly dischargeable effluent and recoverable feed grade by-products. Although total BOD reduction in the discharged permeate 18 is important, it is believed that significant BOD reduction in the dissolved air flotation step 12 also occurs and beneficially affects the subsequent performance of the reverse osmosis separation. Higher loadings of total suspended solids in the incoming wastewater typically mean correspondingly higher BOD levels, simply because of the high concentrations of organics in the wastewater stream. Further, it is known that dissolved air flotation processes are concentration dependent and operate more efficiently at higher suspended solids loadings. Therefore, the DAF step is significant in the reduction of BOD, particularly where the total suspended solids loadings are high. Although the data in TABLE 2 do not include a measure of actual BOD removal in the DAF, the high percentage of removal of total suspended solids (TSS) in the DAF, particularly at the higher concentrations of suspended solids, inherently results in a high percentage reduction in BOD. The total suspended solids in the wastewater typically includes the usual visible solids, such as inorganic particles, and the much smaller colloidal solids, for example proteins. The removal of colloidal suspended solids and the corresponding elimination of the BOD represented therein, is important because it is well known that a high colloidal suspended solids loading on a reverse osmosis membrane results in the need for inordinately high cleaning frequency. In the system of the present invention, premature fouling of the membrane has not been seen.

Similarly, the dissolved air flotation removal step of the method of the present invention has shown surprisingly a high phosphorous removal capability, as shown in the data of Table 2. This is also important to subsequent RO processing because phosphorous, such as in the common form of calcium phosphate, is a known membrane foulant.

It is believed that with respect to solids in the wastewater contributing to BOD, the dissolved air flotation apparatus is primarily responsible for removal of the fats and proteins, and the reverse osmosis apparatus is primarily responsible for removal of the soluble solids such as lactose, other sugars, and acids. Reverse osmosis separation also picks up virtually all of the phosphorous not removed in the DAF step.

The separation provided by membranes less selective than RO may be adequate to provide the separation necessary to reach the low concentrations in the permeate required for direct discharge, depending on the dissolved solids make-up of the wastewater stream. Dairy and other waste streams having a high percentage of very small molecules in solution, e.g. lactose, minerals and acids, require the separation capability provided by reverse osmosis. However, in processing wastewater streams having a high percentage of large molecules as dissolved solids, e.g. fats, proteins and carbohydrates, membranes less selective than RO may be adequate. However, without the preremoval capability of substantial levels of BOD and phosphorous by dissolved air flotation, the membranes would be too heavily loaded and become fouled and/or provide inordinately short operation periods before cleaning. The combination of solids removed by DAF and membrane separation not only provide the basis for a valuable by-product, but also eliminate a substantial volume of waste which would have to be disposed of by the plant operator.

Various modes of carrying out the present invention are contemplated as being within the scope of the following claims particularly pointing out and distinctly claiming the subject matter which is regarded as the invention.

I claim:

1. A method for the recovery of a potentially important feed value or fertilizer by-product comprising proteins, carbohydrates and minerals from a continuous dairy plant process wastewater stream with the concomitant production of high quality environmentally safe discharge stream, said method consisting essentially of the steps of:

(1) adjusting the pH of the wastewater stream to maintain a pH in the range of about 6.5 to 8.0;

(2) subjecting the wastewater stream to dissolved air flotation in the presence of a coagulant to remove a major proportion of the suspended solids;

(3) subjecting the remaining wastewater stream to membrane separation to produce a concentrate containing substantially all remaining dissolved solids and a permeate that is virtually free of all the non-aqueous constituents of the wastewater stream;

(4) retaining, as the by-product, the suspended solids removed in the flotation step and the dissolved solids removed in the membrane separation step; and, (5) discharging, as the high quality discharge stream, the permeate from the membrane separation step.

2. The method as set forth in claim 1 including the preliminary step of screening the stream to remove coarse organic and inorganic solid materials.

3. The method as set forth in claim 2 wherein said screening step comprises removing solid materials of a size greater than about 500 microns.

4. The method as set forth in claim 1 including, prior to the membrane separation step, the step of filtering the wastewater stream to remove substantially all of the remaining suspended solids.

5. The method as set forth in claim 4 wherein said filtering step comprises removing from the water stream substantially all remaining suspended solids of a size greater than about 5 microns.

6. The method as set forth in claim 1 including the step of utilizing a flocculent in the dissolved air flotation step.

7. The method as set forth in claim 1 including the preliminary step of providing temporary storage for the wastewater stream to equalize the waste material content thereof.

8. The method as set forth in claim 7 wherein the wastewater is from a dairy plant wherein the step of adjusting the pH of the wastewater stream to maintain a pH in the range of about 6.5 to 8.0 is performed in said storage step.

9. The method as set forth in claim 1 wherein said membrane separation step includes using a reverse osmosis membrane.

10. A system for the recovery of a potentially important feed value or fertilizer by-product comprising proteins, carbohydrates and minerals from a dairy plant process wastewater stream with the concomitant production of high quality environmentally safe discharge stream consisting essentially of:

a source of dairy plant wastewater;

means for maintaining the pH of the wastewater stream in a range of about 6.5 to 8.0;

means for precipitating and agglomerating the suspended solids in the stream;

a dissolved air flotation device for removing from the stream a major proportion of the agglomerated suspended solids;

a semipermeable membrane separator for removing substantially all remaining solids from the stream and producing a permeate that is virtually free of all the non-aqueous constituents of the stream;

means for retaining the solids recovered from the flotation device and the membrane separator for use as feed value or fertilizer by-product; and, means for discharging the permeate as a high quality discharge stream.

11. The system as set forth in claim 10 including a screen located in the wastewater stream entering the system for removing from the stream coarse organic and inorganic solid materials.

12. The system as set forth in claim 11 wherein the screen is capable of retaining particles of a size greater than about 500 microns.

13. The system as set forth in claim 10 wherein the dissolved air flotation device is capable of removing essentially all suspended matter of a size greater than about 20 to 30 microns.

14. The system as set forth in claim 10 including a filter for removing from the wastewater stream after the flotation device substantially all of the remaining suspended solids.

15. The system as set forth in claim 14 wherein said filter has a porosity in the range of about 5 to 10 microns.

16. The system as set forth in claim 10 wherein said membrane separator has a cut-off of less than about 2 microns.

17. A method for the recovery of potentially important feed value or fertilizer by-product from the cleaning and processing wash and rinse wastewater streams of a dairy plant with the concomitant production of high quality environmentally safe discharge stream, said method consisting essentially of the steps of:

(1) screening the stream to remove coarse organic and inorganic materials;

(2) subjecting the water stream to dissolved air flotation treatment at a pH in a range about 6.5 to 8.0 and in the presence of a coagulant to remove a major proportion of suspended solids;

(3) retaining the solids removed in the flotation step;

(4) filtering the water stream to remove substantially all of the remaining suspended solids;

(5) subjecting the water stream to membrane separation;

(6) retaining the concentrate from the membrane separation step;

(7) discharging the permeate from the membrane separation step; and (8) collecting solids from steps (3) and (6) as feed value or fertilizer by-product.

* * * * *